Dec. 25, 1945. J. R. WIRT 2,391,762
WORK-HOLDER FOR ARC-WELDING APPARATUS
Filed Oct. 20, 1944
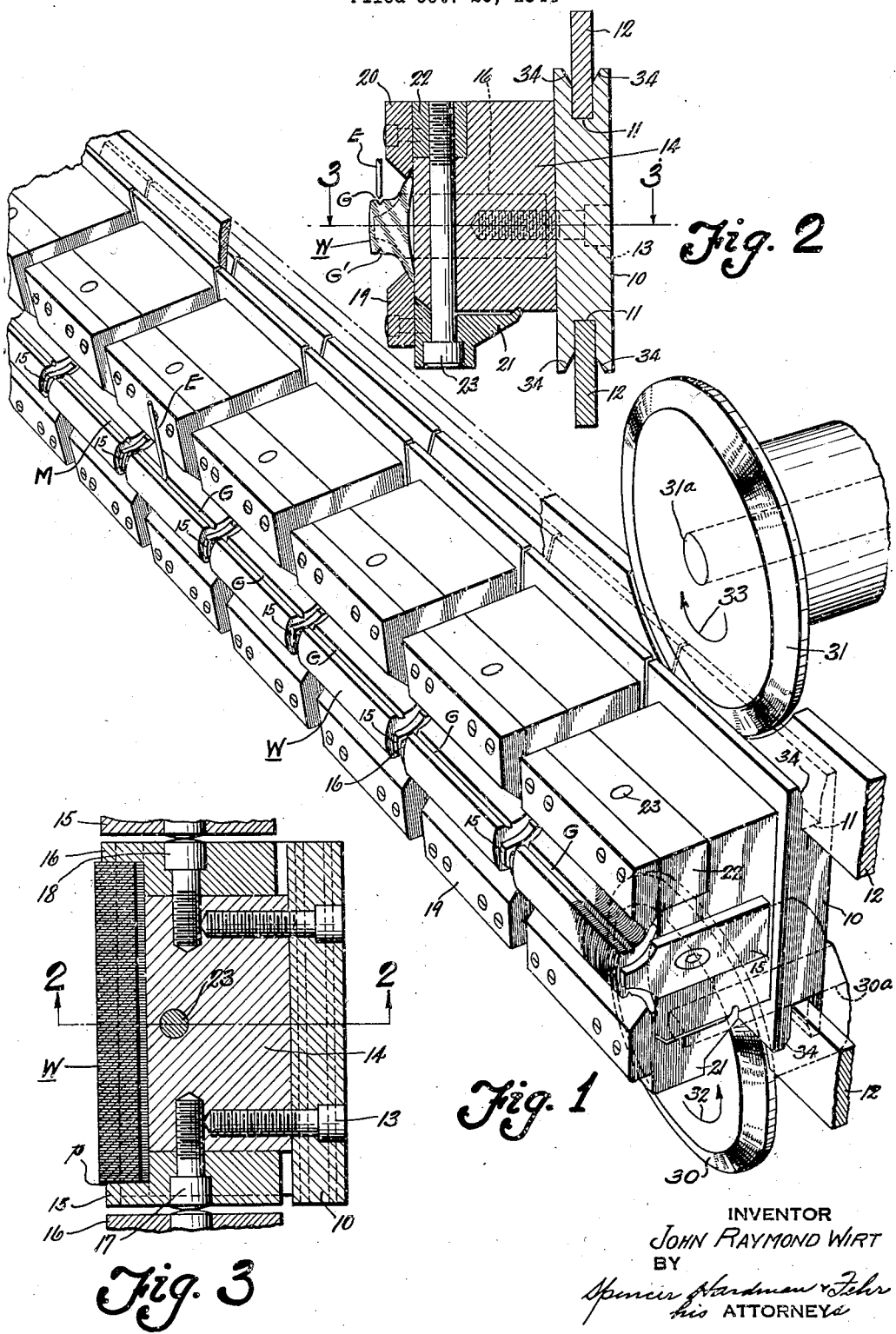
INVENTOR
JOHN RAYMOND WIRT
BY
Spencer Hardman & Fehr
his ATTORNEYs Patented Dec. 25, 1945

2,391,762

UNITED STATES PATENT OFFICE 2,391,762

WORK HOLDER FOR ARC-WELDING APPARATUS

John Raymond Wirt, Anderson, Ind., assignor to General Motors Corporation, Detroit, Mich., a corporation of Delaware Application October 20, 1944, Serial No. 559,582

3 Claims. (Cl. 219—17)

This invention relates to arc-welding and is concerned particularly with the construction of an improved work-holder which carries a part or parts to be welded. For example, such parts may be iron punchings from which a laminated pole piece for a dynamo electric machine is formed by joining a group of punchings at their edges by depositing metal from an arc-welding electrode. The punchings are provided with notches which, when the punchings are grouped on the work-holder, form grooves for receiving the welding metal. The work-holders are caused to move continuously along a track past welding electrodes.

The object of the invention is to prevent extinguishing the arc during the interim between the instant the welded part passes from the arc and the instant an unwelded part arrives at the arc.

The object of the invention is to provide work-holders of such construction as to provide for continuity of the arc as the work-holders move in end-to-end relation along a track for guiding the work relative to an arc-welding electrode while preventing connection by weld material of the work carried by one work-holder with the work carried by a succeeding work-holder. In the disclosed embodiment of the present invention, this object is accomplished by providing, at each end of a work-holder, a block of material of relatively high thermal conductivity, such as forged pure copper, having an arc-contacting face spaced from the welding electrode at a distance exceeding the distance between the electrode and the work to be welded. As the welded work of a preceding work-holder passes away from the electrode, the arc continues between the electrode and the block and the deposition of weld-metal upon the work-piece ceases abruptly. The welding current decreases since the length and resistance of the arc increases; therefore the amount of welding material transferred by the arc to the block decreases. The heat of the arc is less when the arc is between the electrode and the block than when between the electrode and the work. Furthermore the block has such high thermal conductivity that its arc-contacting surface does not attain a welding temperature; therefore the weld-metal which moves from the electrode across the gap to the block does not adhere to the block; and there is no deposit of weld-metal joining the weld-metal deposited on work-pieces of successive work-holders.

Further objects and advantages of the present invention will be apparent from the following description, reference being had to the accompanying drawing, wherein a preferred embodiment of the present invention is clearly shown.

In the drawing:

Fig. 1 is a perspective view showing a train of work-holders carrying parts to be joined by welding.

Fig. 2 is a cross-sectional view of one of the work-holders and is taken on line 2—2 of Fig. 3.

Fig. 3 is a longitudinal sectional view of one of the work-holders and is taken on line 3—3 of Fig. 2.

Referring to the drawing, each work-holder comprises a base 10 having grooves 11 for receiving track bars 12 by which the work-holder is supported for longitudinal movement. Screws 13 connect the base 10 with a block 14 upon which the work-piece W is supported to the work-holder. The work-piece may be, for example, a plurality of punchings $p$ which are to form a pole piece for a dynamo electric machine, the number of punchings being that which may be placed between the projections of blocks 15 and 16 attached to the block 14 by screws 17 and 18 respectively. Lateral movement of the punchings $p$ is limited by confining the toes of the punchings by bars 19 and 20 attached to bars 21 and 22 which are drawn together by clamp screw 23 passing through one of the bars and screw-threadedly engaging the other. All parts of the work-holder are made of steel except the blocks 15 and 16 which are made of a metal of high thermal conductivity, such as forged pure copper.

A train of the work-holders is moved along the track bars 12 by feed rollers 30 and 31 which rotate in the direction of arrows 32 and 33 respectively and are so shaped as to be received by the outwardly flaring surfaces 34 provided by the base 10. It will be understood that loaded work-holders are pushed along the track against the work-holder being engaged by the feed rollers so that there will always be work-holders between the feed rollers receiving motion therefrom in order to push other work-holders adjacent the electrode E. Work-holders loaded with work to be welded may be pushed upon the track toward the feed rollers manually or by a fluid pressure operated device known to those skilled in the art.

The feed rollers 30 and 31 are supported by shafts 30a and 31a respectively which are rotated by an electric motor, not shown; and the shafts are urged laterally toward each other by springs, not shown, in order that yielding pressure will be applied by the feed rollers to the base 10. The rollers 30 and 31 are made of copper and are connected in the welding current circuit which includes a generator and an electrode E of welding wire which has been coated with a flux. The welding electrode E is fed by a welding head, not shown. An arc is formed between the end of the electrode E and the work-piece W, thereby causing metal of the electrode to be deposited as shown at M in the upper grooves G provided by the work-pieces. In the case of a laminated pole piece, the grooves G are formed by the alignment of notches provided by the punchings p. Any suitable form of welding head may be used which operates to feed the welding electrode wire uniformly as the molten weld-metal flows from the end of the electrode across the arc to the work-piece.

When a work-piece has passed the electrode, the arc which was formed between the electrode and the work-piece continues between the electrode and the copper block 15 at the trailing end of the work-holder and then between the electrode and the closely adjacent block 16 on the leading end of the succeeding work-holder and then between the electrode and the work-piece of the succeeding work-holder. Although there is an abrupt increase in length of the arc when the trailing block 15 starts to pass adjacent the electrode E, this change in length occurs because the block 15 provides a conducting path between the end of the arc and the block 14 of the work-holder which is less in resistance than the path provided by the work-piece itself. However, when the length of the arc increases, there will be a decrease in current flowing across the arc and a decrease in the amount of weld-metal flowing from the electrode to the block 15. Since the block 15 has high thermal conductivity, the surface of the block which is subjected to the arc does not attain a welding temperature. Therefore, the globules of weld-metal which flow across the arc do not adhere to the block 15. As the block 15 moves past the electrode E and the closely adjacent block 16 moves adjacent the electrode, the arc continues between the electrode E and the block 16 upon which globules of weld-metal are deposited. The weld-metal does not adhere to the block 16 for the reasons given heretofore, since the block 16 is made of the same material as the block 15. The adjacent blocks 15 and 16 operate practically as one block of material although they are physically separated. In fact, the same effect would be obtained if each space between the work-pieces were occupied by a single block of material of high thermal and electrical conductivity. However, the loading of a work-holder with the required number of punchings to form a pole piece is facilitated by providing each end of the work-holder with a block of such material, the upper ends of the two blocks defining a space which limits the number of punchings which can be placed upon the work-holder.

Since the arc-contacting surfaces of the adjacent blocks 15 and 16 are out of alignment with the arc-contacting surfaces of the work-pieces carried by the adjacent work-holders and since the weld-metal deposited on the blocks 15 and 16 will not adhere to it, no connection between the weld-metal on one work-piece and the weld-metal on another work-piece can occur. Furthermore, there is no connection between the weld-metal on any one work-piece with the bars 15 and 16 between which the work-piece is located. Therefore only the retraction of the clamp bars 19 and 20 is required in order to free the work-piece.

In the case of the pole piece illustrated, after weld-metal has been deposited in the upper groove G, the pole piece and its work-holder are inverted and passed again through the welding apparatus so that weld-metal will be deposited in groove G' which had been the lower groove (Fig. 2) when the pole piece was first passed through the apparatus.

While the embodiment of the present invention as herein disclosed, constitutes a preferred form, it is to be understood that other forms might be adopted, all coming within the scope of the claims which follow.

What is claimed is as follows:

1. A work-holder for use with arc-welding apparatus having means for moving work holders in end-to-end relation along a guiding track past an arc-welding electrode, said work-holder comprising a work-piece support having track-engaging provisions, means for securing a work-piece to the support, and a block of metal of high thermal and electrical conductivity attached to the support and extending into the space between work-pieces of adjacent work-holders when on the guiding track and having a portion adjacent to the end of the work-piece and providing an arc-contacting surface spaced from the electrode at a distance greater than the gap between the electrode and the work.

2. A work-holder for use with arc welding apparatus having means for moving work-holders in end-to-end relation along a guiding track past an arc-welding electrode, said work-holder comprising a work-piece support having track-engaging provisions and providing a surface for receiving a plurality of flat metal pieces to be welded together, two blocks of metal of high thermal and electrical conductivity each attached to an end of the support and having a portion projecting beyond the work-piece receiving surface of the support, the projecting portions having arc-contacting surfaces spaced from the electrode at distances greater than the gap between the electrode and the work, the space between the projecting portions of the blocks determining the number of pieces placed upon the support, and means for securing the pieces to the support.

3. For use in arc-welding apparatus having means for moving a train of parts past an arc-welding electrode, a unit of the train comprising the combination of a holder for supporting the work to be welded and a block of material of high thermal and electrical conductivity extending into the space between work carried by successive holders and providing an arc-contacting surface spaced from the electrode at a distance greater than the gap between the electrode and the work.

JOHN RAYMOND WIRT.